United States Patent [19]

Liden

[11] Patent Number: 4,760,530

[45] Date of Patent: Jul. 26, 1988

[54] FLIGHT MANAGEMENT SYSTEM PROVIDING MINIMUM TOTAL COST

[75] Inventor: Sam P. Liden, Phoenix, Ariz.

[73] Assignee: Honeywell Inc., Minneapolis, Minn.

[21] Appl. No.: 875,115

[22] Filed: Jun. 17, 1986

[51] Int. Cl.⁴ .................. G06F 15/50; G05D 1/00
[52] U.S. Cl. .............................. 364/442; 364/440; 364/148
[58] Field of Search ............... 364/442, 433, 434, 440, 364/439, 427, 428, 430, 148, 431.07, 431.01; 244/178, 180; 73/178 T

[56] References Cited

U.S. PATENT DOCUMENTS

| | | | |
|---|---|---|---|
| 4,063,072 | 12/1977 | Sochtig et al. | 364/431 |
| 4,159,088 | 6/1979 | Cosley | 364/442 X |
| 4,312,041 | 1/1982 | De Jonge | 364/442 |
| 4,325,123 | 4/1982 | Graham et al. | 364/431.07 |
| 4,642,775 | 2/1987 | Cline et al. | 364/443 |

OTHER PUBLICATIONS

Stenget et al., "Energy Management for Fuel Conservation in Transport Aircraft", 7/76, IEEE Transactions on Aerospace and Electronic Systems, pp. 464-470.

Farmer, "Delco Electronics Flight Management System", 5/1980, Proceedings of IEEE 1980 National Conference on Aerospace and Electronics, pp. 191-198.

*Primary Examiner*—Parshotam S. Lall
*Assistant Examiner*—Thomas G. Black

*Attorney, Agent, or Firm*—Seymour Levine; Albin Medved

[57] ABSTRACT

A flight management system that provides an airspeed command to control a flight profile pursuant to minimum total cost. Total cost is the sum of direct operating cost and arrival time error cost and direct operating cost is the sum of fuel cost plus flight-time cost. A predictor, in response to trial cost index values, generates direct operating cost and arrival time values corresponding to the trial cost index values. A parabolic function approximator generates a parabolic approximation to the direct operating cost vs. arrival time function corresponding to the trial cost index values. An arrival error cost function is added to the direct operating cost function and the minimum of the combined function is obtained to provide an optimum arrival time signal. The trial cost index values and the corresponding arrival time values are applied to a parabolic approximator to obtain a cost index vs. arrival time function. The optimum arrival time signal is applied to this function to provide the optimum cost index signal corresponding thereto. A speed generator is included for generating an airspeed signal corresponding to the optimum cost index signal in accordance with minimum direct operating cost. A predictor generates a predicted arrival time signal in accordance with the optimum cost index signal. A speed adjuster adjusts the airspeed signal to provide the airspeed command signal in accordance with the difference between the optimum arrival time signal and the predicted arrival time signal.

30 Claims, 5 Drawing Sheets

FLIGHT MANAGEMENT SYSTEM PROVIDING MINIMUM TOTAL COST

BACKGROUND OF THE INVENTION

1. Field of the Invention

The invention relates to Flight Management Systems (FMS) providing minimum total cost flight profiles particularly with respect to accounting for arrival error cost functions.

2. Description of the Prior Art

Flight Management Systems are known in the art that utilize an adjustable cost index in providing a minimum-cost flight profile. The ARINC characteristic 702 defines Flight Management Systems for commercial aircraft.

A principal objective of an FMS is to minimize the cost of flight. Present day equipment achieves this objective by generating vertical and lateral profiles that minimize direct operating cost (DOC). Direct operating cost is the cost of fuel plus other costs that are proportional to flight time. Flight time costs, such as crew costs, maintenance, repair and replacement of equipment, that may be prorated with flight time, is represented in the FMS by a cost index, which is defined as the ratio of time cost (dollars/hour) to fuel cost (cents/pound), providing units that are proportional to fuel flow (100 lb./hr). The cost index is selectable by the pilot (usually in the range of 0 to 999), and is intended to remain fixed for a given flight, representing predetermined flight-hour costs. For a given cost index, the prior art FMS provides a speed command at every point in the flight profile that minimizes DOC.

A significant disadvantage to the prior art FMS utilizing the DOC approach is that such systems do not reflect costs associated with arrival-time error, such as crew overtime, losses due to missed connections in connecting flights and potential losses resulting from customer dissatisfaction with the airline. The cost index is often utilized in prior art Flight Management Systems as a means for adjusting speed to achieve on-time arrival on an average basis. When utilized in this manner, the cost index for a city pair is selected to achieve the desired arrival time under average wind and traffic conditions. Therefore, in the prior art, the cost index is selected to achieve a statistical arrival time performance for a given city pair, without taking into account conditions for an individual flight. The cost index, when so utilized, no longer represents the flight-hour cost as initially intended, but becomes a mechanism for adjusting arrival time. It is appreciated that not arriving on time normally results in additional cost to a scheduled airline, which cost is not accounted for in present day flight management systems that search for the minimum cost profile in accordance with DOC.

SUMMARY OF THE INVENTION

The present invention is a Flight Management System for aircraft comprising means for generating a function of direct operating cost (DOC) versus arrival time in accordance with a range of cost index values. Means for combining the DOC function with a function of arrival time error cost versus arrival time error, generates a function of total flight cost versus arrival time. Minimizing means determines the minimum of the total flight cost function to provide an optimum arrival time signal and means responsive to the optimum arrival time signal provides an optimum cost index signal corresponding thereto. Speed generator means responsive to the optimum cost index signal generates an airspeed signal corresponding to the optimum cost index signal in accordance with minimum DOC. The system includes a predictor for generating a predicted arrival time signal. Speed adjustor means responsive to the optimum arrival time signal, the predicted arrival time signal and the airspeed signal adjusts the airspeed signal in accordance with the difference between the optimum arrival time signal and the predicted arrival time signal to provide an airspeed command signal for controlling the airspeed of the aircraft.

DESCRIPTION OF THE PREFERRED EMBODIMENT

Figure 1:
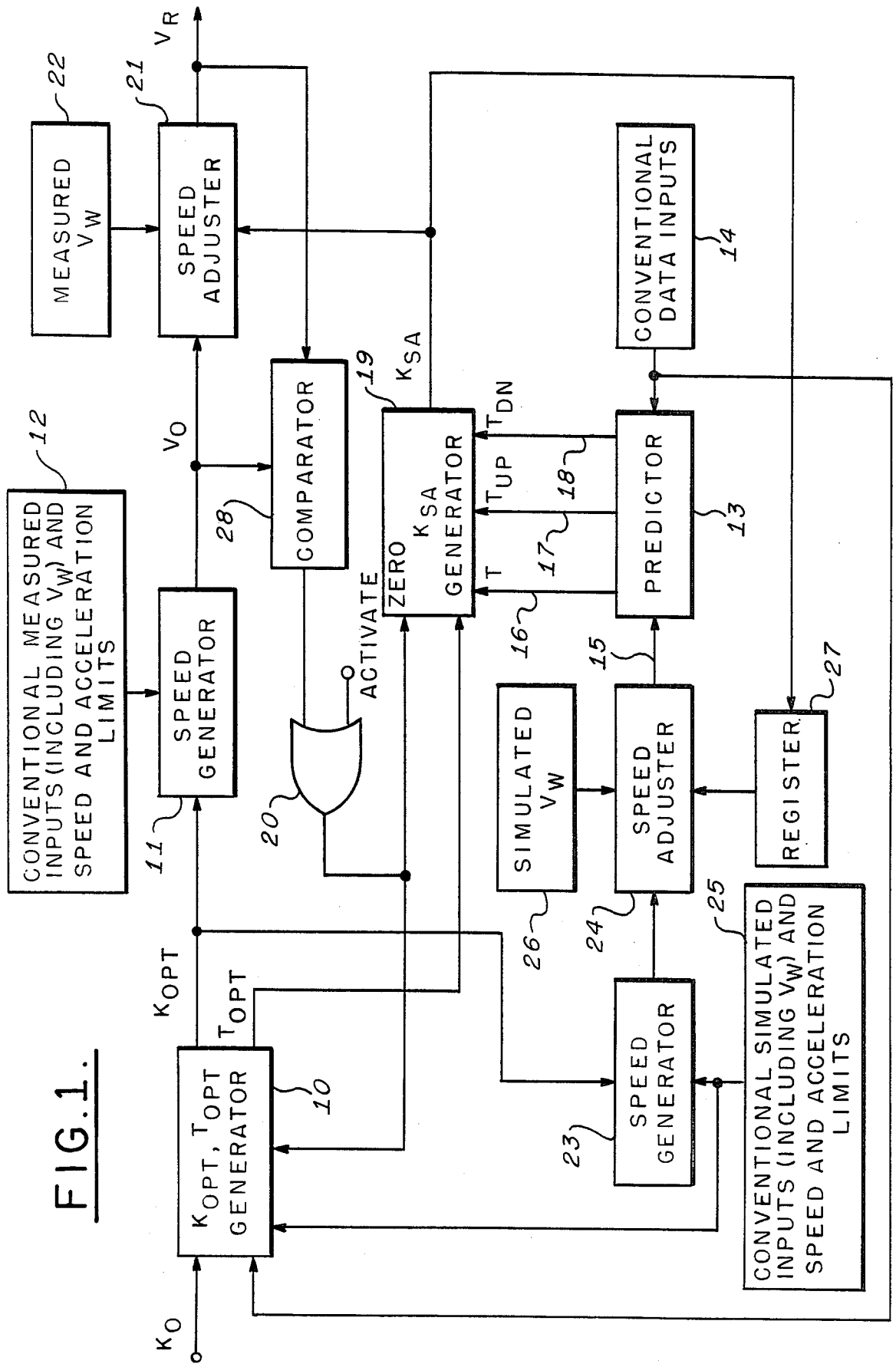
FIG. 1 is a schematic block diagram of flight management system apparatus implemented in accordance with the present invention.

Referring to FIG. 1, a schematic block diagram of flight management apparatus implemented in accordance with the present invention is illustrated. The apparatus includes a $K_{OPT}$, $T_{OPT}$ generator 10 responsive to an input cost index signal $K_O$ that is generally manually selected by the pilot. The value selected is intended to represent the actual flight-hour cost, excluding fuel cost, as previously described. The generator 10 provides an optimum arrival time signal $T_{OPT}$ and the associated cost index signal $K_{OPT}$. $T_{OPT}$ is the optimum arrival time at the flight plan prescribed destination waypoint that minimizes total flight cost. $K_{OPT}$ is the cost index that results in that arrival time. In a manner to be described in detail, total flight cost is the sum of DOC and arrival time error cost. Although the arrival point is normally the destination waypoint, the apparatus of the present invention may also be utilized with respect to intermediate waypoints along the flight plan. The reference point for time is arbitrary but for the embodiment of the invention described herein is assumed to be at take off. In a manner to be described, the generator 10 is enabled to provide values of $T_{OPT}$ and $K_{OPT}$ whenever a new flight plan is activated or when a flight plan is altered so as to effect flight time. The details of the structure and operation of the generator 10 will be later described.

The flight management system apparatus of FIG. 1 includes a speed generator 11 that provides a true airspeed signal $V_0$ in response to the $K_{OPT}$ signal from the generator 10. The speed generator 11 is a conventional part of present day commercially available flight management systems that in response to a cost index value K provides a true airspeed command that minimizes DOC. Thus, in the prior art, the output $V_0$ of the speed generator 11 would be the true airspeed command normally provided as an output of the prior art FMS, which output would in the prior art be coupled to the automatic flight control system of the aircraft to control the airspeed thereof. The $V_0$ signal from the speed generator 11 is modified, in accordance with the invention, in a manner to be described before it is provided as a system output.

In the prior art, one of the inputs to the speed generator 11 would be the cost index K which normally is the value selected manually by the pilot. In the present invention, the cost index input to the speed generator 11 is the $K_{OPT}$ signal provided by the generator 10. The speed generator 11 conventionally receives inputs schematically represented by the block 12. Such inputs usually include measured values of aircraft gross weight, altitude, wind, temperature and air pressure as well as speed and acceleration limits imposed by the aircraft flight envelope, the airframe and engine limitations, the guidance laws and the flight plan. A speed generator suitable for utilization in the apparatus of FIG. 1 comprises a part of the flight management computer commercially procurable from the Aerospace and Marine Group of the Assignee of the present invention. The inputs from the block 12 are those applied to the speed generator in the prior art appartus. The cost index input to the speed generator 11 in the present invention is provided by the $K_{OPT}$ signal from the generator 10 rather than the $K_0$ signal manually selected by the pilot in the prior art.

The apparatus of FIG. 1 includes a predictor 13 that performs a fast time simulation of aircraft flight from the current aircraft position along the prescribed flight plan to the destination waypoint. In a manner similar to that described above with respect to the speed generator 11, the predictor 13 is a part of prior art flight management systems. The flight management computer discussed above commercially available from the present Assignee contains a predictor suitable for use as the predictor 13 of FIG. 1. As is well appreciated in the art, the predictor 13 receives a variety of conventional data inputs represented schematically by a block 14. The conventional data inputs represented by the block 14 comprise models of the aircraft including the airframe and engines and models of the atmosphere along the flight profile that the aircraft is expected to fly. The atmospheric models include wind, temperature and pressure forecasts. The conventional data inputs 14 include the aircraft flight envelope, the flight plan, the guidance laws as well as speed, acceleration and position, constrains and limitations of the flight plan. The predictor 13 also requires a speed command input on a line 15 identical to the speed command output $V_R$ of the apparatus of FIG. 1, except that instead of measured inputs from aircraft sensor data, the speed command input to the predictor 13 on the line 15 utilizes simulated data inputs in a manner to be later described in detail. The predictor 13, in a manner well understood in the art, models the aerodynamics of the aircraft pursuant to the data inputs thereto to simulate the flight of the aircraft from the current aircraft position to the destination waypoint. The predictor 13 accordingly provides an estimate of the flight time from the current position to the destination as well as the fuel burn required therefor. The predictor 13 also provide similar data with respect to the intermediate waypoints along the flight plan. The predictor 13 iteratively and continuously provides successive simulations of the aircraft flight from the current position to the destination waypoint as the aircraft proceeds along the flight plan.

The structure, functions and operations of the predictor 13 are essentially identical to the predictor in prior art flight management systems with the predicted arrival time or flight time to the destination provided on a line 16. Although the predictor 13 provides a fuel burn prediction to the destination point, this signal is not shown as an output from the predictor 13. This output is, however, utilized with respect to a predictor included in the generator 10 in a manner to be described.

The predictor 13 also provides signals denoted as $T_{UP}$ and $T_{DN}$ on lines 17 and 18 respectively. The prior art predictor is modified to provide $T_{UP}$ and $T_{DN}$ as follows. The prior art predictor includes an accumulator for accumulating predicted arrival time during a prediction. The predictor 13 further includes two additional accumulators for accumulating $T_{UP}$ and $T_{DN}$, respectively, during the prediction. Speed and acceleration limits over segments of the flight plan prevent speed adjustments during these segments necessitating greater speed adjustments over the remaining segments. The data inputs 14 inform the predictor 13 of the flight plan segments during which speed and acceleration limits are imposed. The flight plan, as well as the air frame and engine models, have such speed and acceleration limits included therein. The $T_{UP}$ accumulator is inhibited from accumulating during segments in which the aircraft is subject to an upper speed or acceleration limit. The $T_{DN}$ accumulator is inhibited from accumulating during segments in which the aircraft is subject to a lower speed or acceleration limit. Thus, $T_{UP}$ is the total time during the prediction when the speed is permitted to be upwardly adjusted and $T_{DN}$ is the total time during the prediction when the speed is permitted to be downwardly adjusted. The time segments excluded are those where a speed limit, imposed either by the flight plan or by aircraft limits, prevents the speed from being increased or decreased, respectively. Also excluded are the periods where the aircraft is accelerating or decelerating at a limited value. If during a prediction no speed or acceleration limits are applied, T, $T_{UP}$ and $T_{DN}$ will be equal.

It is appreciated from the foregoing, that the predictor 13 provides a fast time simulation of flight from the current aircraft position to the destination waypoint, as well as to the intermediate waypoints of the flight plan, pursuant to a cost index value. The predictor 13 takes into account winds, flight plan constraints, guidance laws and the like at every point along the flight plan, simulating aircraft drag, thrust, fuel flow and the like.

The apparatus of FIG. 1 further includes a $K_{SA}$ generator 19 for generating a speed adjustment factor $K_{SA}$ utilized in fine tuning the speed output $V_0$ from the speed generator 11 so as to achieve high accuracy in the arrival time at the destination waypoint. Each time the predictor 13 performs a prediction pass to provide the estimated flight time T to the destination waypoint, on the line 16, the $K_{SA}$ generator 19 compares the time T with the optimum arrival time signal $T_{OPT}$ from the generator 10 and updates the previous value of the speed adjustment factor $K_{SA}$ based on the comparison between T and $T_{OPT}$ and on the $T_{UP}$ and $T_{DN}$ signals on the lines 17 and 18. The $K_{SA}$ factor remains constant until again updated by a subsequent prediction pass.

Specifically, the $K_{SA}$ generator 19 updates the previous value of the speed adjustment factor $K_{SA}$ each time the predictor 13 has completed a prediction to the destination waypoint as follows:

$$K_{SA}(\text{new}) = K_{SA}(\text{previous}) + \text{DELTA-T}\#/\#T_A$$

Where
DELTA $T = T - T_{OPT}$

T = predicted arrival time on line 16

$T_A = T_{UP}$ if DELTA T#>#0 and $T_{DN}$ otherwise $T_{UP}$ = the signal on line 17

$T_{DN}$ = the signal on line 18

Thus it is appreciated that if at the end of a prediction pass the arrival time at the destination is late, $T_{UP}$ is utilized in updating $K_{SA}$ thereby increasing the airspeed during the segments of the flight plan during which speed limitations are not imposed. Similarly, if the arrival time is early, $T_{DN}$ is utilized in updating $K_{SA}$ thereby decreasing the airspeed during those segments of the flight plan where there are no speed limitations.

The $K_{SA}$ factor is utilized in adjusting the speed $V_0$ from the speed generator 11 in a manner to be described. The initial value of $K_{SA}$ is zero, rendering $V_R = V_0$ until completion of the first prediction pass. The $K_{SA}$ generator 19 initializes the value of $K_{SA}$ to zero by a signal from an OR gate 20 whenever the generator 10 is activated in a manner to be described.

The speed adjustment factor $K_{SA}$ from the $K_{SA}$ generator 19 is applied to a speed adjuster 21 which is also responsive to the airspeed signal $V_0$ from the speed generator 11. The speed adjuster 21 also receives an input $V_W$ representative of the measured value of a tail wind or head wind as schematically represented by a block 22. It is appreciated that a head wind is the negative of a tail wind, and that a positive value represents a tail wind. The speed adjuster 21 utilizes $K_{SA}$, which is a constant between prediction passes of the predictor 13, to adjust the speed $V_0$, which is continuously changing to provide the true airspeed command $V_R$ of the system in accordance with $$V_R = (V_0 + K_{SA}V_W)\#/\#(1\# - \#K_{SA})$$

The $V_R$ signal is applied to the autopilot or autothrottle system of the aircraft to control the airspeed thereof.

Alternatively, the speed adjuster 21 may be implemented to embody the following:

$$V_R = V_0 + K_{SA}V_{GR}$$

Where $V_{GR}$ is the adjusted ground speed at the current prediction position and is equal to $$V_{GR} = V_R + V_W$$

As discussed above, the input 15 to the predictor 13 is identical to the $V_R$ output of the speed adjuster 21 except that the input 15 to the predictor 13 utilizes simulated inputs instead of actual sensor data. Accordingly, a speed generator 23 identical to the speed generator 11 provides an airspeed signal to a speed adjuster 24 which is identical to the speed adjuster 21. The output of the speed adjuster 24 provides the airspeed input to the predictor 13 on the line 15. The speed generator 23 receives the $K_{OPT}$ signal from the generator 10 in the same manner as the speed generator 11. The $K_{OPT}$ value remains constant unless the generator 10 is reactivated as described herein.

The speed generator 23 also receives conventional simulated inputs including $V_W$ from a wind forecast model and speed and acceleration limits as schematically represented by a block 25. The inputs provided by the block 25 are identical in type to the inputs provided by the block 12 except that the data from the block 12 is from actual aircraft sensors whereas the corresponding data from the block 25 is simulated.

The speed adjuster 24 receives a simulated $V_W$ signal from the wind forecast model as schematically represented by a block 26. The simulated $V_W$ from the block 26 corresponds to the measured $V_W$ from the block 22. The speed adjuster 24 also receives an input from a register 27 which is utilized to hold the value of $K_{SA}$ corresponding to the previous prediction pass of the predictor 13.

Thus it is appreciated that the $V_R$ input to the predictor 13 on the line 15 is derived from the previous iteration of the predictor 13 and during the current iteration, the $K_{OPT}$ value applied to the speed generator 23 and the $K_{SA}$ value applied to the speed adjuster 24 are constants that do not change while the current prediction pass is being executed.

As discussed above, the generator 10 is activated whenever a new flight plan is introduced or when a flight plan is changed in a manner that affects flight time. As the actual flight progresses without such flight plan change, the generator 10 is also activated when the true airspeed command $V_R$ deviates from $V_0$ by a predetermined threshold. Accordingly, the OR gate 20 receives an Activate signal to activate the generator 10 whenever a new flight plan is introduced or when the flight plan is changed so as to affect flight time. A comparator 28 responsive to the $V_0$ signal from the speed generator 11 and the $V_R$ signal from the speed adjuster 21 provides an input to the OR gate 20 whenever the difference between $V_R$ and $V_0$ is greater than a predetermined threshold set into the comparator 28. Additionally, whenever the OR gate 20 activates the generator 10, the value of $K_{SA}$ in the generator 19 is set to zero. The conventional data inputs 14 and the conventional simulated inputs 25 are also applied as inputs to the $K_{OPT}$, $T_{OPT}$ generator 10 for reasons to be described.

As previously discussed, the $K_{OPT}$, $T_{OPT}$ generator 10 provides the optimum arrival or flight time $T_{OPT}$ that minimizes total flight cost and the optimum cost index $K_{OPT}$ that results in the optimum flight time. The total flight cost for a given cost index may be expressed as $$J(K) = DOC(K) + AEC(T_E)$$

Where $$DOC(K) = C_F[F(K) + K_0 T_F(K)]$$

K = cost index (a variable) in units of fuel flow (100 lb/hr)

$K_0$ = the value of K that represents actual flight-hour cost (a constant)

$C_F$ = unit cost of fuel (cents/lb)

F(K)=the fuel burn (100 lb) resulting with cost index K $T_F(K)$=the flight time (hr) resulting with cost index K AEC($T_E$)=arrival error cost function ($)

$T_E$=arrival time error (actual arrival time minus scheduled arrival time)

The predictor of the prior art FMS discussed above provides $T_F(K)$ and F(K), as the result of a prediction pass for a given K. With the constants $K_0$ and $C_F$ given, DOC may be obtained from the above expression.

Figure 2:
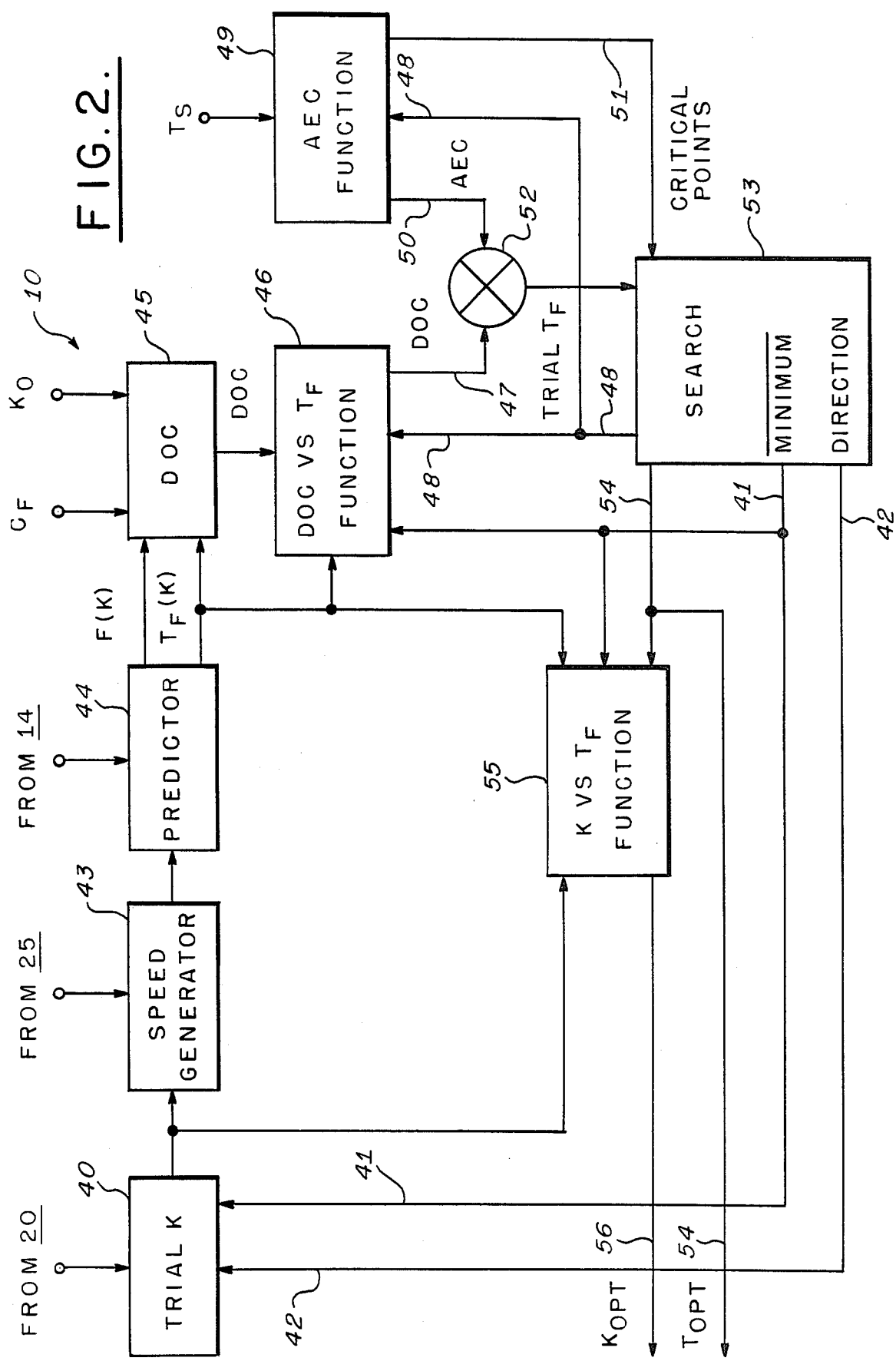
FIG. 2 is a schematic block diagram illustrating a preferred implementation for the $K_{OPT}$, $T_{OPT}$ generator of FIG. 1.

FIG. 2 is a schematic block diagram illustrating a preferred implementation for the $K_{OPT}$, $T_{OPT}$ generator 10 of FIG. 1. In order to appreciate the interrelationships among the elements of FIG. 2, a representative flight is considered. A flight over a 1,000 nautical mile flight plan is undertaken. The initial and final altitudes are 1,000 feet and a cruise altitude of 35,000 feet is selected without step climbs or descents. The International Standard Atmosphere is assumed, and the initial gross weight is 350,000 lbs. The 250 kt. ATC speed limit was observed below 10,000 feet altitude and the aircraft was at speed at the initial and final altitudes. A head wind was applied of 50 kt. magnitude at 35,000 feet altitude, decreasing linearly to zero at sea level. A clean configuration for the aircraft was assumed throughout the flight. The following values of cost index (100 lb/hr) were considered: −100, −75, −50, −25, −10, 0, 10, 25, 50, 75, 100, 150, 200, 300, 400, 600, 800 and 1,000.

Figure 3:
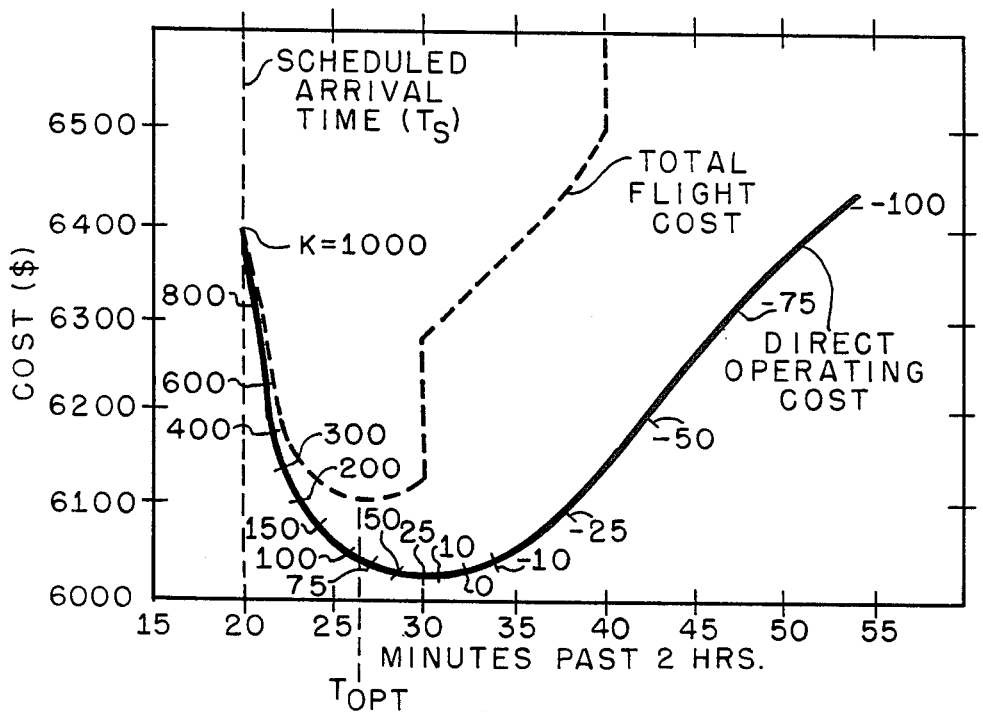
FIG. 3 is a diagram illustrating a direct operating cost versus flight time function and a total flight cost versus flight time function usable in describing the apparatus of FIG. 2.

The value of cost index that represents actual flight-time cost usually resides in the range of 25 to 75. During the representative flight $C_F$=13 cents/lb and $K_0$=50. The scheduled arrival time based on a no-wind condition with $K_0$=0, corresponds to a flight time of 2 hours and 20 minutes. FIG. 3 (solid line) illustrates direct operating cost versus flight time for the representative flight described above with the corresponding cost index values K illustrated along the curve.

As described above, total flight cost is the sum of direct operating cost and arrival time error cost. In order to implement the $K_{OPT}$, $T_{OPT}$ generator 10 on arrival error cost function for the particular flight plan must be stored in the apparatus. The arrival error cost function is predefined and provided by the airline. The airline decides, based on crew overtime, lossed due to missed connections, potential losses resulting from customer dissatisfaction and airline policies regarding flight time pay, what it will cost for the aircraft to be late (or early) with respect to the scheduled arrival time. The arrival error costs are expected to be different for each termination and therefore the arrival error cost functions will be generally different from each arrival situation. The arrival error cost function, AEC($T_E$) must be defined for all arrival time error values $T_E$, should be equal to zero for $T_E$=0, and should not decrease as $|T_E|$ increases. It is appreciated that there is a cost penalty whether the aircraft is late or early with respect to the scheduled arrival time. Arrival error costs continually increase with increasing late arrival. The time points at which step changes in the function, or in its slope, occur must be accommodated. These time points are referred to as the AEC critical points.

The $K_{OPT}$, $T_{OPT}$ generator 10, detailed in FIG. 2, conveniently stores the AEC function in the following format:

$$AEC(T_E) = \sum_I SIGMA(T_I, S_I, M_I)$$

SIGMA($T_I$, $S_I$, $M_I$) is a sloping step function of time which steps up for increasing positive $T_E$, and also for decreasing negative $T_E$. SIGMA($T_I$, $S_I$, $M_I$) executes a step of size $S_I$ at step point $T_E$=$T_I$ and continues with slope $M_I$. The set of time points $\{T_I\}$ are the AEC critical points. The SIGMA function is defined in terms of $T_I$, $S_I$, and $M_I$ by:

$$SIGMA(T_I, S_I, M_I)\# = \# \begin{cases} \{S_I + M_I(T_I\# - \#T_E) \text{ if } T_E < T_I \leq 0 \\ \{0 \text{ if } (T_I \leq T_E \leq 0) \text{ or } (0 \leq T_E \leq T_I) \\ \{S_I + M_I(T_E\# - \#T_I) \text{ if } 0 \leq T_I < T_E \end{cases}$$

In the SIGMA format for storing component I of the AEC function, there is a cost penalty for early arrival as well as for late arrival. The upper line of the functional expression is utilized for early arrival, the lower line is used for late arrival and the middle line is utilized for arrival within $\pm T_I$ of $T_{OPT}$. If $T_I$=0, then the upper line applies with $T_E$ is slightly less than ZERO and the lower line applied when $T_E$ is slightly greater than ZERO. Although the illustrated format for constructing the AEC function is convenient, other valid formats may be utilized to the same effect.

Figure 4:
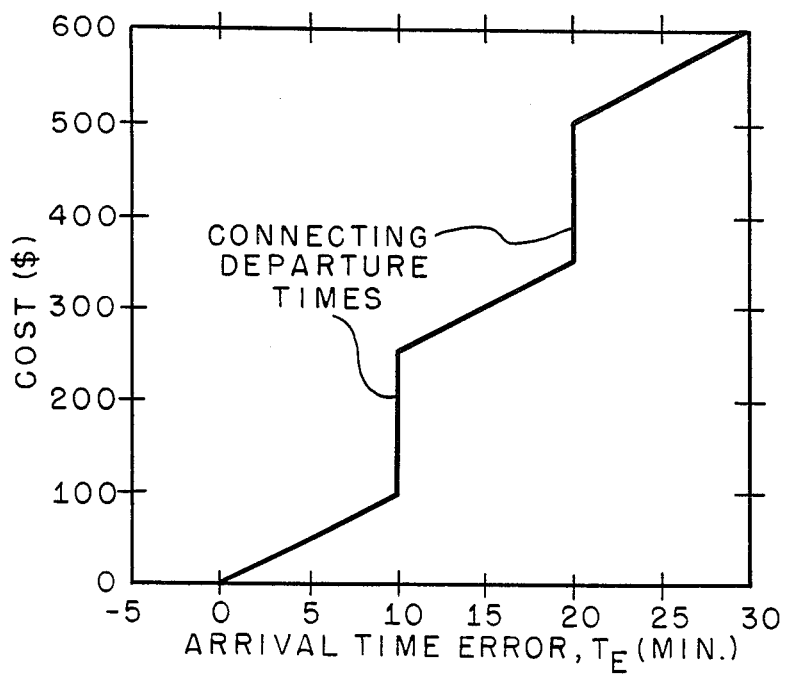
FIG. 4 is a diagram of an arrival error cost versus arrival time error function usable in constructing the total flight cost function of FIG. 3.

Referring to FIG. 4, an exemplary AEC function is illustrated comprised of a linear component of $600.00/hr for $T_E\#>\#0$ and critical points at 0, 10 and 20 minutes. Two steps representing losses of $150.00 each, resulting from missed flight connections, are illustrated at 10 and 20 minutes. No cost penalty is assigned for early arrival. The AEC function of FIG. 4 is represented in the SIGMA format by $$AEC(T_E)=SIGMA(0,0,10)+SIGMA(10,150,0)+SIGMA(20,150,0)$$

It is appreciated that the AEC function is not necessarily comprised of linear segments. The segments between the steps may exhibit any appropriate functional curve. It is appreciated, however, that in any event, the entire curve can be approximated by a series of piece-wise linear segments which may then be stored in the SIGMA format.

Referring again to FIG. 3, the arrival error cost function of FIG. 4 is added to the direct operating cost versus flight time function of FIG. 3 to provide the total flight cost versus flight time function illustrated in dashed line. The arrival time error $T_E$ of FIG. 4 is referenced to the scheduled arrival time $T_S$ of two hours and twenty minutes in deriving the total flight cost curve. The optimum flight time $T_{OPT}$, provided by the $K_{OPT}$, $T_{OPT}$ generator 10 of FIG. 1 is determined from the minimum of the total flight cost curve of FIG. 3. In the example illustrated, $T_{OPT}$ is approximately two hours and twenty-six minutes, or six minutes late. The optimum cost index resulting in the optimum flight time is in the range of 75 to 100 (approximately 85). On-time arrival would require a cost index of 900 and an additional cost of approximately $250.00. Utilizing a cost index K of zero, a connecting flight is missed and the total cost is approximately $200.00 more than the optimum. It is appreciated that the optimum cost index is that which minimizes J(K).

Each point of the DOC curve of FIG. 3 can be generated by performing a prediction pass for a trial cost index. This is generally an undesirably costly procedure with respect to FMS computer time and cannot be performed for a large number of trial cost index values without excessive response time. It is desirable to minimize the number of prediction passes in generating the true airspeed command $V_R$ in accordance with the invention.

The preferred implementation of the $K_{OPT}$, $T_{OPT}$ generator 10 of FIG. 1 is predicted on the property that large variations in cost index near the optimum cost index value have a negligible effect on total cost unless the minimum point of the total flight cost curve (FIG. 3) is proximate a critical point. With reference to FIG. 3, the cost index can vary from about 30 to 130 with only a $10.00 variation in total cost. This variation in cost index corresponds to over four minutes variation in arrival time which is approximately 3% of the flight time. Therefore, the generation by the generator 10 of FIG. 1 of the optimum cost index $K_{OPT}$ does not have to be very precise and the optimum arrival time $T_{OPT}$ is only required to be precise if it is proximate a critical point.

The preferred implementation of the generator 10 of FIG. 1 for generating the optimum arrival time and cost index comprises utilizing cost index values from a reference set thereof from which parabolic interpolation is utilized to estimate intermediate values. A preferred reference set, in units of 100 lb/hr is:

(−100, −50, −25, −10, 25, 150, 400, 1000)

The generator 10 of FIG. 1 is implemented to perform the following procedure to estimate the optimum arrival time and optimum cost index:

1. Select the three cost index values −10, 25 and 150 from the reference set. Alternatively select three cost index values from the reference set that are expected to reside in the vicinity of the optimum value. The vicinity may be estimated from previous values of cost index that provided approximately correct arrival time on previous flights between the departure and destination points.

2. Perform predictions with the three cost index values to obtain corresponding values for DOC and flight time.

3. Fit a parabola to the three points to approximate DOC versus flight time and then add the predefined arrival error cost function to obtain an approximate function of total flight cost versus flight time.

4. Perform a simple search, such as a linear search, on this total flight cost versus flight time function to obtain the minimum point. The search intervals can be fairly large, such as 60 seconds, but must include the AEC critical points. The time at the minimum point is the optimum arrival time $T_{OPT}$.

5. If the resulting $T_{OPT}$ minimum point resides outside the span of the three prediction times, a further adjacent trial cost index from the reference set is selected, in the appropriate direction, and another prediction is performed that replaces the previous prediction furthest removed. The steps from item 3 are then repeated.

Figure 5:
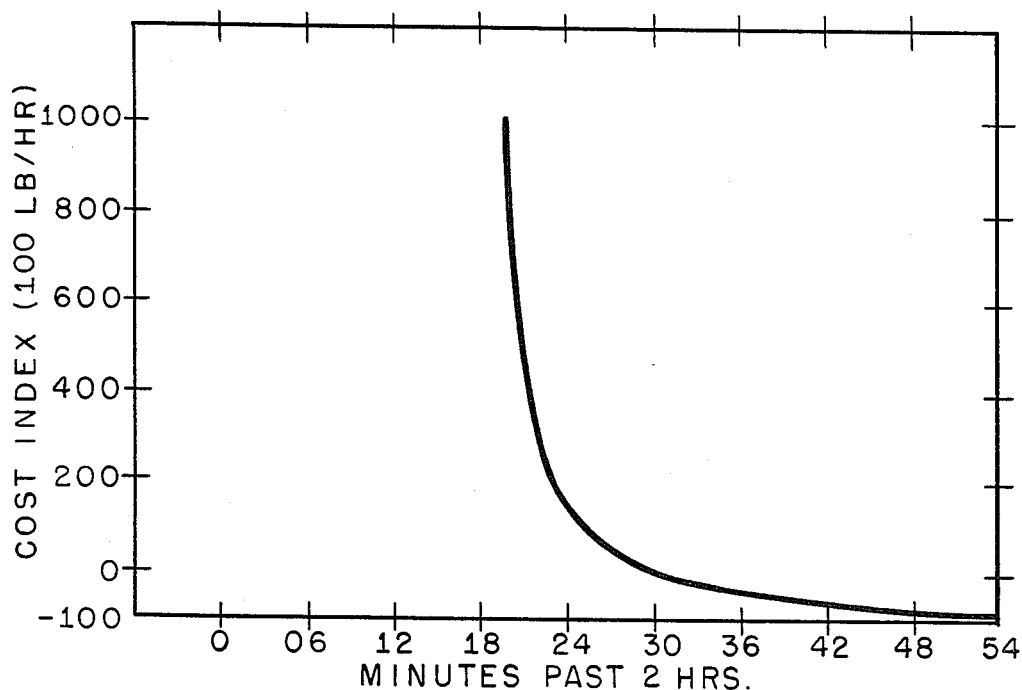
FIG. 5 is a diagram of a cost index versus flight time function usable in describing the apparatus of FIG. 2.

6. Determine the optimum cost index, $K_{OPT}$, corresponding to $T_{OPT}$ by performing parabolic interpolation on the three prediction values of cost index versus flight time. FIG. 5 illustrates a curve of flight time versus cost index for the illustrative flight described above.

It is appreciated from the foregoing that the scheduled arrival time is not necessarily the optimum arrival time. For the illustrative flight arriving six minutes late minimized the total cost.

Referring to FIG. 2, a preferred implementation of the $K_{OPT}$, $T_{OPT}$ generator 10 of FIG. 1 is illustrated. The generator 10 includes a block 40 for providing a timed sequence of trial cost index values. The block 40 stores the reference set of cost index values discussed above (−100 through 1,000) and sequentially provides values −10, 25 and 150. The block 40 is also implemented to provide the next higher or next lower cost index value from the reference set in response to a signal on a line 41. Whether this new trial cost index value is a higher value or a lower value than the initially provided three values is controlled by a signal on a line 42. The operation of the block 40 is activated by the output of the OR gate 20 of FIG. 1.

Each trial cost index value from the block 20 is applied to a speed generator 43. The speed generator 43 is identical to the speed generator 23 of FIG. 1 and in a manner similar to the speed generator 23 receives the conventional simulated inputs, including simulated wind, and speed and acceleration limits from the block 25. The speed generator 43 provides a true airspeed signal corresponding to the input trial cost index value in the manner described above with respect to the speed generator 23.

The airspeed signal output of the speed generator 43 provides the airspeed input to a predictor 44. The predictor 44 is identical to the predictor 13 of FIG. 1 as described above and receives the same conventional data inputs 14 that are applied to the predictor 13. For each trial cost index value provided by the block 40, the predictor 44 performs a prediction pass and provides a flight time to the destination $T_F(K)$ and the fuel burn to the destination F(K) corresponding to the trial cost index provided by the block 40. As discussed above, the present invention is applicable not only to flight time to the destination but to estimated time of arrival (ETA) at intermediate waypoints. When so utilized, the fuel burn and time outputs of the predictor 44 are with respect to such intermediate waypoints.

The F(K) and $T_F(K)$ outputs of the predictor 44 are applied to a direct operating cost function block 45. The block 45 also receives the unit cost of fuel constant $C_F$#(cents/lb) as well as the $K_0$ input described above with respect to FIG. 1. For each trial cost index provided by the block 40, the direct operating cost function block 45 provides the direct operating cost (DOC) corresponding thereto in accordance with the DOC expression provided above.

The flight time signal $T_F(K)$ from the predictor 44 and the direct operating cost signal (DOC) from the function block 45 are applied to a DOC vs. $T_F$ function generation block 46. The three flight time and DOC values corresponding to the initial three trial cost index values (−10, 25 and 150) are sequentially applied to the block 46 and stored therein. The DOC vs. $T_F$ function block 46 is implemented to generate a quadradic polynomial approximation of the DOC vs. flight time curve passing through the three points stored therein. Standard parabola fitting techniques are utilized implementing an equation such as DOC=$A_0$#+#$A_1$#$T_F$#+#$A_2$#$(T_F)^2$. The three values of $T_F$ and DOC provide three equations from which $A_0$, $A_1$ and $A_2$ may be derived. With the coefficients $A_0$, $A_1$ and $A_2$ now known constants, DOC is provided by the block 46 on a line 47 in response to a $T_F$ input on a line 48 utilizing this parabolic polynomial. It is appreciated that although parabolic interpolation is utilized to generate the DOC vs. $T_F$ function in the block 46, higher order polynomials may also be utilized to the same effect as well as other known means of curve fitting. As discussed above, FIG. 3 illustrates the direct operating cost versus flight time curve for the representative flight discussed above.

The $K_{OPT}$, $T_{OPT}$ generator 10 further includes an AEC function storage block 49 for storing the arrival time error cost function discussed above. Conveniently, the AEC function is stored in a piece-wise linear fashion pursuant to the SIGMA construction as explained hereinabove. The AEC function storage block 49 also receives a signal $T_S$ representative of the scheduled arrival time for the flight. A subtractor within the block 49 subtracts $T_S$ from trial flight time inputs $T_F$ to provide arrival time error $T_E$. $T_E$ generates an AEC cost pursuant to the stored SIGMA function. The trial $T_F$ values are applied on a line 48 and the corresponding AEC cost values are applied to a line 50. The AEC function storage block 49 also provides the critical AEC time points on a line 51. The AEC function block 49 references the AEC critical points in terms of arrival time error $T_E$ to the scheduled arrival time $T_S$ by adding $T_E$ to $T_S$ to provide the AEC critical time points on the line 51. FIG. 4 illustrates a typical AEC function as described above.

The value of DOC on the line 47 and the value of AEC on the line 50 are applied to a summing function 52 to provide the sum thereof. The output of the summing function 52 is the total flight cost corresponding to the trial $T_F$ signal applied on the line 48. FIG. 3 (dashed line) illustrates the total flight cost curve for the representative flight discussed above.

The $K_{OPT}$, $T_{OPT}$ generator 10 includes a search function block 53 that searches for the minimum point on the total flight cost curve to provide the optimum flight time $T_{OPT}$. The search function 53 provides a sequence of trial $T_F$ values on the line 48 and the summing function 52 provides the total flight cost corresponding to the trial $T_F$. The search function 53 begins at the earliest reasonable flight time $T_F$ that is prior to the scheduled arrival time and receives a total flight cost value that is stored therein. $T_F$ is increased by, for example, sixty seconds, or to the next occuring AEC critical point if this is prior to the sixty second increment, and a second value of total flight cost is received by the search function 53 and stored. The search function 53 sets the direction signal on the line 42 to be representative of increasing $T_F$. The second value of total flight cost is compared to the first value thereof and if total flight cost is decreasing, the search is advanced by an additional sixty second increment or again to the next occuring critical point. The first value of total flight cost is then discarded. The search continues in this manner until total flight cost begins to increase. The previous trial $T_F$ value is then $T_{OPT}$. Alternatively, upon reaching the trial $T_F$ value that results in the increased cost, the trail $T_F$ may be decremented by, for example, ten seconds to provide $T_{OPT}$.

If, however, the comparison of the first two obtained total flight cost values indicates that increasing the trial $T_F$ values results in increasing cost, the trail $T_F$ values are decremented in increments of sixty seconds, accounting for the AEC critical points as described above, until the minimum value is obtained to provide $T_{OPT}$. If the direction of search is reversed, the direction signal on the line 42 is reversed to represent decreasing trial $T_F$. It is appreciated that all of the critical points within the search range are utilized in finding the minimum total flight cost value.

If the search function 53 issues a trial $T_F$ value that corresponds to an end point of the DOC vs. $T_F$ function stored in the block 46 without attaining the minimum value, a signal representative of minimum-not is applied to the line 41. The end point of the DOC vs. $T_F$ function corresponds to the end point of the range of trial cost index values provide by the block 40. If the minimum total flight cost point is not attained, as indicated by the signal on the line 41, the block 40 provides the next occuring cost index value in the reference set and the apparatus adds a point corresponding thereto to the DOC vs. $T_F$ function stored in the block 46 in the manner described above. The search function 53 then searches for the minimum total flight cost value on the extended total flight cost curve. The trial K block 40 selects the next occuring trial cost index value in the direction indicated by the direction signal on the line 42. If the direction signal on the line 42 is representative of increasing $T_F$, the next smaller cost index value is utilized. If the direction signal on the line 42 is representative of decreasing $T_F$, the next larger cost index value is issued by the block 40.

When the minimum total flight cost value is attained, the corresponding trial $T_F$ is issued on a line 54 as the signal $T_{OPT}$.

The $K_{OPT}$, $T_{OPT}$ generator 10 further includes a K vs $T_F$ function generation block 55. The block 55 receives as inputs the trial cost index values provided from the block 40 and the corresponding flight time signal $T_F(K)$ from the predictor 44. The function generating block 55 generates a parabolic approximation of the K vs $T_F$ curve in the same manner as described above with respect to the block 46. The minimum-not signal on the line 41 is applied to the function blocks 46 and 55 to control extending the curves stored therein when the search function 53 determines that a minimum has not been attained as described above. The $T_{OPT}$ signal on the line 54 is applied to the function block 55 which provides the corresponding cost index value on a line 56 as $K_{OPT}$. FIG. 5 illustrates the flight time versus cost index function corresponding to the representative flight described above.

The apparatus and method described above represents a practical compromise between accuracy and processing load, predicated on the property that the total flight cost curve is relatively insensitive to change in cost index, and that sensitivity to arrival time is significant only in the vicinity of the AEC critical points, such as the scheduled arrival time or connecting flight times. Since these critical points are predefined and utilized in the search procedure, the accuracy of an optimum point at a critical time is ensured. The procedure will normally require only three prediction passes.

Generally, however, the procedure for obtaining the optimum cost index $K_{OPT}$ is:

(1) Determine the time $T_{OPT}$ that minimizes total flight cost from a total flight cost versus flight time curve such as that discussed above with respect to FIG. 3 and (2) Find the corresponding cost index from a cost index versus flight time curve such as that discussed above with respect to FIG. 5.

Figure 6:
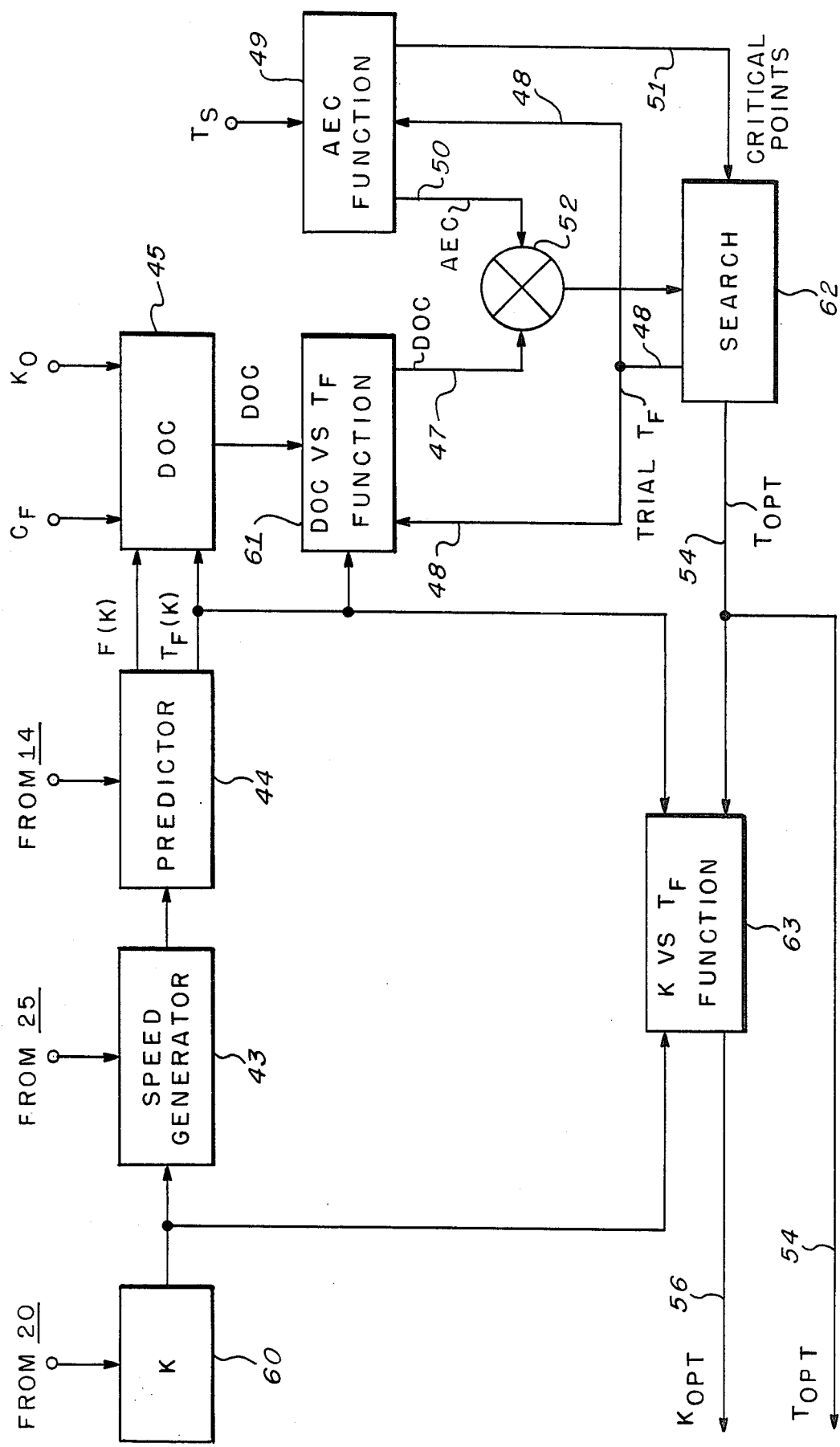
FIG. 6 is a schematic block diagram of an alternative embodiment of the $K_{OPT}$, $T_{OPT}$ generator of FIG. 1.

Referring to FIG. 6, an alternative embodiment for the $K_{OPT}$, $T_{OPT}$ generator 10 is illustrated that generates the complete curves to any desired resolution. Like reference numerals represent like components with respect to FIG. 2. A block 60 provides a sequence of cost index values with arbitrary resolution over the full range thereof. The generator 10 is activated by the output of the OR gate 20 of FIG. 1 as discussed above with respect to FIG. 2. Each value of K is processed by the speed generator 43, the predictor 44 and the DOC block 45 in the manner discussed above with respect to FIG. 2. The values of DOC and $T_F(K)$ are applied to a DOC vs. $T_F$ function block 61 where the full range of curve values are stored therein in, for example, tabular form. The AEC function is stored in the block 49 in the manner described above with respect to FIG. 2 and combined with DOC by the summing function 52. A search function 62 provides the trial $T_F$ values to the blocks 61 and 49 to search for the minimum of the total flight cost curve in the manner described above with respect to FIG. 2. Since the entire range of values is initially generated and stored in the block 61, the search function 62 determines the minimum $T_{OPT}$ without utilizing the minimum-not signal on the line 41 and the direction signal on the line 42 as described above with respect to FIG. 2. The generator 10 of FIG. 6 also includes a K vs $T_F$ function generator 63 that stores the full range of cost index values from the block 60 and the corresponding $T_F(K)$ values from the predictor 44 in, for example, tabular form. The $T_{OPT}$ signal on the line 54 is then translated by table lookup into the corresponding $K_{OPT}$ value on the line 56.

It is appreciated with respect to FIGS. 1, 2 and 6 that timing circuitry and control signals are applied to the various blocks to control the sequence of events described above. It is appreciated that the DOC vs. $T_F$ functions in the blocks 46 (FIG. 2) and 61 (FIG. 6) are first generated and then the search functions 53 (FIG. 2) and 62 (FIG. 6) perform the search in timed fashion thereafter. The various component blocks of FIGS. 1, 2 and 6 are preferably functional program segments of a stored program digital computer embodiment of the invention. In such a stored program version of the invention, it is appreciated that the multiple uses of the predictor and the speed generator would be implemented in the software embodiment by calling the speed generator routine and the predictor routine when required, with appropriate inputs applied thereto. Alternatively, each of the blocks may be implemented, in a conventional manner, by discrete analog or digital logic circuits.

After the $K_{OPT}$, $T_{OPT}$ generator 10 provides the optimal arrival time $T_{OPT}$ and the approximately optimal cost index $K_{OPT}$, the apparatus of FIG. 1 then fine-tunes the speed to obtain the high arrival time accuracy provided by the signal $V_R$ as described above.

Figure 7:
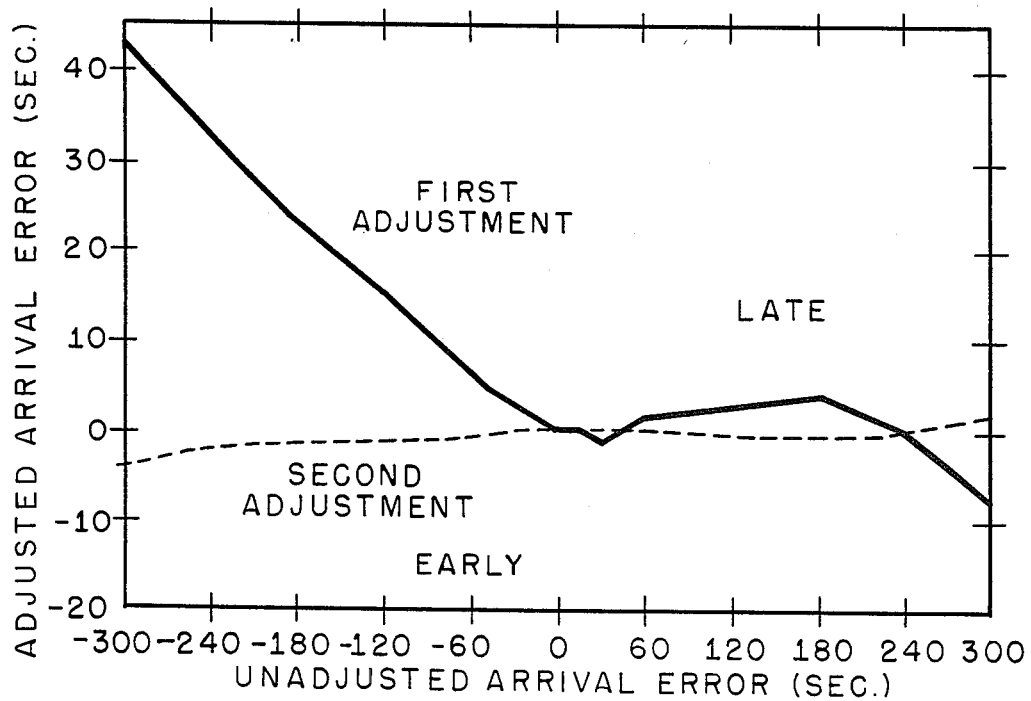
FIG. 7 is a diagram illustrating convergence of the speed adjustment performed in accordance with the invention.

Referring to FIG. 7, a diagram demonstrating convergence of the speed adjustment performed in the manner described above is illustrated. The previously described representative flight was executed with no wind and a cost index of zero, which results in a flight time of 2:19:58. Fourteen situations of time constraints were performed, corresponding to required arrival time that deviates from the resulting flight time by ±15 seconds, ±30 seconds, ±1 minute, ±2 minutes, ±3 minutes, ±4 minutes and ±5 minutes. FIG. 7 illustrates the result of the speed adjustment of the apparatus of FIG. 1 after one and two adjustments. For example, if the nonadjusted speed results in a three-minute late arrival, then the first adjustment reduces the arrival error to 3.6 seconds and the second adjustment to −0.5 seconds. The early arrival situations tend to over adjust on the first adjustment. For example, when the nonadjusted speed corresponded to a five-minute early arrival, the result of the first adjustment was a 43-second late arrival. The second adjustment results in a 4.3-second early arrival. FIG. 7 illustrates the rapidity with which the speed adjustment procedure converges. With just one or two prediction passes, the speed adjustment apparatus and procedure of the present invention provides very high arrival time accuracy.

Thus, the present invention provides a practical method for generating the true airspeed command in an FMS that results in minimum total flight cost. The method is comprised of two parts:

(1) finding the arrival time and associated cost index that results in minimum total flight cost, and (2) fine-tuning the speed command obtained with this cost index to achieve high arrival time accuracy. The part one procedure is performed when the flight plan is changed and infrequently thereafter. The part two procedure is performed in connection with the prediction computations that are normally performed in the prior art FMS on a repeated basis.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. Flight Management System apparatus for aircraft comprising means for generating a DOC signal which is a function of direct operating cost (DOC) versus arrival time in accordance with a range of cost index values, means for storing values of arrival time error cost (AEC) versus arrival time error and providing an AEC signal which is function of said values, means for combining said DOC signal with said AEC signal to provide a total flight cost signal which is a function of total flight cost, thereby establishing a signal representative of total flight cost versus arrival time, minimizing means responsive to said total flight cost signal for determining a minimum thereof to provide an optimum arrival time signal, means responsive to said optimum arrival time signal for providing an optimum cost index signal corresponding thereto, speed generator means responsive to said optimum cost index signal for generating an airspeed signal corresponding thereto in accordance with minimum direct operating cost, predictor means responsive to said optimum cost index signal for generating a predicted arrival time signal in accordance therewith, and speed adjuster means responsive to said optimum arrival time signal, said predicted arrival time signal and said airspeed signal for adjusting said airspeed signal in accordance with the difference between said optimum arrival time signal and said predicated arrival time signal to provide an airspeed command signal for controlling the airspeed of said aircraft.

2. The apparatus of claim 1 wherein said DOC signal generating means comprises
means for providing a plurality of trial cost index value signals,
further predictor means responsive to each of said trial cost index value signals for generating a further predicted arrival time signal and a further DOC signal in accordance with said further predicted arrival time, and
means responsive to said further predicted arrival time signal and said further DOC signal corresponding to each of said trial cost index value signals for generating said DOC signal in accordance with said further predicted arrival time signals and said further DOC signals.

3. The apparatus of claim 2 in which said means responsive to said further predicted arrival time signal and said further DOC signal comprises polynomial estimating means responsive to said further predicted arrival time signal and said further DOC signal corresponding to each of said trial cost index value signals for generating a polynomial estimate curve in accordance with said further predicted arrival time signals and said further DOC signals.

4. The apparatus of claim 3 in which said polynomial estimating means comprises a estimator for generating a parabolic estimate of said DOC signal.

5. The apparatus of claim 3 in which said DOC signal generating means, said storing means and said combining means comprise means for generating said signal representative of total flight cost versus arrival time.

6. The apparatus of claim 5 in which said minimizing means comprises search means for providing trial arrival time signals to said total flight cost versus arrival time signal generating means so as to activate said total flight cost versus arrival time signal generating means to provide to said search means values of total flight cost corresponding to said trial arrival time signals.

7. The apparatus of claim 6 in which said search means comprises means for comparing successive values of said total flight time costs corresponding to successive values of said trial arrival time signals for determining the trial arrival time signal corresponding to the minimum value of said total flight time costs.

8. The apparatus of claim 7 in which said search means further includes
means for providing a minimum-not signal representative of a minimum total flight cost value not being detected, and
means for providing a direction signal representative of whether said trial arrival time signals are increasing or decreasing when said minimum-not signal is generated.

9. The apparatus of claim 8 in which said trial cost index value signal providing means is responsive to said minimum-not signal and said direction signal for providing an additional trial cost index value signal to extend said polynomial estimate curve in the direction of the minimum thereof.

10. The apparatus of claim 8 in which said storing means comprises means for storing said AEC values with critical time points in accordance with connecting flight times.

11. The apparatus of claim 10 in which said trial arrival time signals include said critical time points.

12. The apparatus of claim 3 in which said means responsive to said optimum arrival time signal comprises means further responsive to said trial cost index value signals and said further predicted arrival time signals for generating a polynomial estimate curve in accordance therewith.

13. The apparatus of claim 2 in which said further predictor means comprises
further speed generator means responsive to each of said trial cost index value signals for generating an airspeed signal corresponding thereto in accordance with minimum direct operating cost,
a predictor responsive to said airspeed signal from said further speed generator means for providing a predicted arrival time signal and a predicted fuel burn signal in accordance therewith, and
a DOC generator responsive to said predicted arrival time signal and said predicted fuel burn signal from said predictor and further responsive to said input cost index value signal representative of unit cost of fuel for generating said further DOC signal in accordance therewith.

14. The apparatus of claim 13 in which said DOC generator comprises means for generating said further DOC signal in accordance with $$DOC = C_F[F(K) + K_0 T_F(K)]$$

where
$C_F$ = Unit cost of fuel
$F(K)$ = Fuel burn resulting with cost index K
$K_0$ = Value of K that represents actual flight-hour cost
$T_F(K)$ = Flight time resulting with cost index K.

15. The apparatus of claim 1 in which said means for storing comprises means for storing said AEC values with critical time points in accordance with connecting flight times.

16. The apparatus of claim 1 in which said means for combining comprises means for adding said AEC signal to said DOC signal to provide said total flight cost signal.

17. The apparatus of claim 1 in which said DOC signal generating means, said storing means and said combining means comprise means for generating said signal representative of total flight cost versus arrival time.

18. The apparatus of claim 17 in which said minimizing means comprises search means for providing trial arrival time signals to said total flight cost versus arrival time signal generating means so as to activate said total flight cost versus arrival time signal generating means to provide signals to said search means representative of values of total flight cost corresponding to said trial arrival time signals.

19. The apparatus of claim 18 in which said search means comprises means for comparing successive values of said total flight time costs corresponding to successive values of said trial arrival time signals for determining the trial arrival time signal corresponding to the minimum value of said total flight time costs.

20. The apparatus of claim 19 in which said search means further includes
means for providing a minimum-not signal representative of a minimum total flight cost value not being detected, and
means for providing a direction signal representative of whether said trial arrival time signals are increasing or decreasing when said minimum-not signal is generated.

21. The apparatus of claim 1 in which said speed generator means includes means for providing measured aircraft and atmosphere parameter signals to said speed generator means for generating said airspeed signal in accordance with minimum direct operating cost.

22. The apparatus of claim 21 in which said predictor means includes means for providing simulated aircraft and atmosphere parameter signals, corresponding to said measured aircraft and atmosphere parameter signals to said predictor means for generating said predicted arrival time signal in accordance with said optimum cost index signal.

23. The apparatus of claim 22 in which said predictor means comprises means for generating said predicted arrival time signal, a $T_{UP}$ signal and a $T_{DN}$ signal, where said $T_{UP}$ and $T_{DN}$ signals represent predicted flight time adjusted for time segments having speed or acceleration limits associated therewith.

24. The apparatus of claim 23 in which said speed adjuster means comprises
a speed adjustment factor generator responsive to said optimum arrival time signal and said predicted arrival time signal for generating a speed adjustment factor signal in accordance with the difference therebetween, and
a speed adjuster responsive to said airspeed signal and said speed adjustment factor signal for providing said airspeed command signal in accordance therewith.

25. The apparatus of claim 24 in which said speed adjustment factor generator comprises means responsive to said $T_{UP}$ and $T_{DN}$ signals for generating said speed adjustment factor further in accordance with a selected one of said $T_{UP}$ and $T_{DN}$ signals.

26. The apparatus of claim 25 in which said speed adjustment factor generator comprises means for generating said speed adjustment factor signal in accordance with $$K_{SA}(\text{new}) = K_{SA}(\text{previous}) + \text{DELTA-}\#T/\#T_A$$

where
$K_{SA}$ = said speed adjustment factor signal
DELTA-T = T − $T_{OPT}$
T = said predicted arrival time signal
$T_{OPT}$ = said optimum arrival time signal
$T_A = T_{UP}$ if DELTA-T > 0, $T_{DN}$ otherwise
$T_{UP}$ = the total time during a prediction when speed may be adjusted upwardly
$T_{DN}$ = the total time during a prediction when speed may be adjusted downwardly.

27. The apparatus of claim 26 in which said speed adjuster comprises means responsive to a measured wind signal for further adjusting said airspeed signal in accordance therewith.

28. The apparatus of claim 27 further including means for generating an activation signal for activating said DOC signal generating means, said speed adjustment factor generator being responsive to said activation signal for setting $K_{SA}$ to zero when said DOC signal generating means is activated.

29. The apparatus of claim 26 in which said speed adjuster comprises means for providing said airspeed command signal in accordance with $$V_R = (V_0 + K_{SA} V_W)/(1 - K_{SA})$$

where
$V_R$ = said airspeed command signal
$V_O$ = said airspeed signal
$V_W$ = tail wind or negative head wind.

30. A flight management system method for aircraft comprising the steps of
generating a function of direct operating cost (DOC) vs. arrival time in accordance with a range of cost index values,
storing a function of arrival time error cost, (AEC) vs. arrival time error,
combining said DOC function with said AEC function to provide a function of total flight cost vs. arrival time,
determining the minimum of said total flight cost vs. arrival time function to provide an optimum arrival time signal,
providing an optimum cost index signal corresponding to said optimum arrival time signal,
generating an airspeed signal corresponding to said optimum cost index signal in accordance with minimum direct operating cost,
generating a predicted arrival time signal in accordance with said optimum cost index signal, and
adjusting said airspeed signal in accordance with the difference between said optimum arrival time signal and said predicted arrival time signal to provide an airspeed command signal for controlling the airspeed of said aircraft.

* * * * *